US005355359A

United States Patent [19]
Lee

[11] Patent Number: 5,355,359
[45] Date of Patent: Oct. 11, 1994

[54] CARTRIDGE EJECTOR OF AN OPTICAL DISC PLAYER

[75] Inventor: Jong-wan Lee, Suwon, Rep. of Korea

[73] Assignee: Samsung Electronics Co., Ltd., Kyungki-do, Rep. of Korea

[21] Appl. No.: 63,690

[22] Filed: May 20, 1993

[30] Foreign Application Priority Data

May 26, 1992 [KR] Rep. of Korea ............... 92-9138

[51] Int. Cl.$^5$ .................. G11B 33/02; E05F 1/08
[52] U.S. Cl. ..................... 369/77.2; 16/278
[58] Field of Search .............. 369/77.2, 77.1, 75.1; 360/132, 133, 137; 267/107, 108, 109, 154, 155, 157, 166, 179; 16/75, 278, 286, 295, 298, 308

[56] References Cited

U.S. PATENT DOCUMENTS

| | | | |
|---|---|---|---|
| 2,138,517 | 11/1938 | Vance | 267/155 |
| 4,107,753 | 8/1978 | Izumikawa | 360/137 |
| 4,994,930 | 2/1991 | Uehara | 360/97.01 |
| 5,062,013 | 10/1991 | Gotoh | 360/90 |
| 5,124,975 | 6/1992 | Naoki et al. | 369/291 |

FOREIGN PATENT DOCUMENTS

| | | |
|---|---|---|
| 62-224873 | 10/1987 | Japan . |
| 9119071 | 12/1991 | World Int. Prop. O. ............ 16/308 |

Primary Examiner—Robert S. Tupper
Assistant Examiner—William J. Klimowicz
Attorney, Agent, or Firm—Sughrue, Mion, Zinn, Macpeak & Seas

[57] ABSTRACT

A cartridge ejector of an optical disc player, which softly accomplishes ejection of the cartridge in two steps. An elastic devices, which biases a lever which makes a shutter of the cartridge open and close and ejects the cartridge, is a torsion spring having a coil portion combined at a hinge of the lever, a first support portion formed at one end of the coil portion, a second support portion formed at the other end of the coil portion, and a third support portion which is formed at the end of said second support portion, and of which selectively comes into contact with the holder.

5 Claims, 3 Drawing Sheets

CARTRIDGE EJECTOR OF AN OPTICAL DISC PLAYER

BACKGROUND OF THE INVENTION

1. Field of the Invention

The present invention relates to a cartridge ejector of an optical disc player, and more particularly to the cartridge ejector of an optical disc player which smoothly ejects a cartridge in two steps.

2. Description of the Related Art

Generally, since an optical disc is a very precise recording medium, even slight damage thereto can cause information recorded in the optical disc to be poorly reproduced. Therefore, it has recently been proposed to insert the optical disc in a case or cartridge, so as to protect the optical disc from damage which often occurs when the optical disc is handled. Optical disc players of CD-ROM, MODD, etc., which carry out recording and reproducing by using such a cartridge, receive the disk and cartridge, open a shutter of the cartridge inserted in the disc player and have a cartridge ejector for ejecting the cartridge to an exterior of the disc player during playback.

FIG. 1 illustrates a conventional optional disc player. The conventional optical disc player has turntable 4, spindle motor 5 for making turntable 4 rotate, optional pick-up 6 for recording information on the disc or reproducing the recorded information, and loading device including loading motor 7.

Loader 2, which transports cartridge 30 to turntable 4, is movably installed on frame 1. On the surface of loader 2 is holder 3, which receives cartridge 30. Holder 3 is inserted in hooking groove 33 of cartridge 30, and locker 9 serves to fix the position of holder 3. On the other side of holder 3 is disposed cartridge ejector 10, which opens shutter 31 of cartridge 30 and causes cartridge 30 to be ejected to an exterior of the disc player.

FIG. 2 shows a conventional cartridge ejector 10. The conventional cartridge ejector has lever 11, which is installed at one side of cartridge holder 3 to be capable of rotating about hinge shaft 12, torsion spring 13, which is combined with hinge shaft 12 so that one end of the torsion spring is in contact with lever 11 and the other end is in contact with cartridge holder 3, thereby biasing lever 11 with a predetermined force. Roller 14 is installed at a free end of lever 11 and is engaged with groove 32 for opening and closing a shutter 31 of cartridge 30.

The operation of conventional cartridge ejector 10 is described below. First, when cartridge 30 is inserted in cartridge holder 3, roller 14 engages with groove 32. As cartridge 30 is inserted further, shutter 31 of cartridge 30 is caused to slide open (to the left in FIG. 2) by virtue of contact with roller 14 as lever 11 rotates in a clockwise direction about hinge shaft 12 (see chain-dotted lines in FIGS. 1 and 2). When cartridge 30 is completely inserted in cartridge holder 3, cartridge 30 is fixed with respect to holder 3 in the state where locker 9 is inserted in hooking groove 33 of cartridge 30, and, at the same time, shutter 31 is completely opened. At this time, since lever 11 is biased against shutter 3 t of cartridge 30, shutter 31 maintains its opened state.

When cartridge 30 is ejected from the optical disc player, according to the unloading operation of the optical disc player, locker 9 is separated from hooking groove 33 of cartridge so that lever 11 re-rotates in the counterclockwise direction to its initial location by the biasing force of torsion spring 13 installed between hinge shaft 12 of lever 11. Accordingly, cartridge 30, which is in contact with roller 14 of lever 11, is pushed out into an entrance of cartridge holder 3, and, at the same time, shutter 31 closes due to a biasing force on shutter 31.

Here, the force for ejecting cartridge 30 is the force of biasing spring 13 combined with the biasing three on shutter 31 of cartridge 30. Any forces for clamping ejection of cartridge 30 are the frictional forces against the closing of the shutter 31 and the movement of cartridge 30.

Generally, the optical disc player is installed in a horizontal position or a perpendicular position. Therefore, depending on the installed state, the combined frictional forces may be relatively large so as to properly oppose the force to eject cartridge 30. Accordingly, the ejection of cartridge 30 is relatively smooth. However, if the optical disc player is installed so that the combined frictional forces are small, the cartridge is ejected too quickly and may become separated from the disc player.

That is, in the cartridge ejector of the conventional optical disc player, since the elastic force due to the torsion spring is predetermined, ejection of the cartridge can be excessively fast or incomplete, depending on the installed position of the disc player.

SUMMARY OF THE INVENTION

An object of the present invention is to provide a cartridge ejector of an optical disc player for preventing fast ejection and separation of the cartridge from the disc player, as well as reducing the deviation of the ejected quantity of the cartridge, regardless of the installed position of the disc player.

To accomplish this object, there is provided a cartridge ejector of an optical disc player having a cartridge holder for receiving and transporting the cartridge, a lever which can be rotated about a hinge shaft disposed on the cartridge holder, and an elastic biasing device for biasing the lever.

The elastic device is a torsion spring having a coil portion of a predetermined number of coils. A first support portion extends from one end of the coil portion so as to contact with and support the cartridge holder and a second support portion extends from the other end of the coil portion so as to contact with the support lever. A third support portion extends from the end of the second support portion so that the end thereof selectively contacts with the cartridge holder.

According to the present invention, when ejecting the cartridge from a disc player, elastic forces of the coiled portion and the third support portion of the torsion spring operate at the same time, initially. Then, when the end of the third support portion is separated from the cartridge holder, only the elastic forces of the coiled portion operates as the force for ejecting the cartridge. Accordingly, the cartridge is not ejected too quickly or separated from the disc player.

BRIEF DESCRIPTION OF THE DRAWINGS

Further features and advantages of the invention will become more apparent from the following description of the preferred embodiment of the invention, as illustrated in the accompanying drawings in which the same reference characters refer to similar parts throughout and in which.

DETAILED DESCRIPTION OF THE PREFERRED EMBODIMENT

A preferred embodiment of the present invention will now be described with reference to appended drawings.

Figure 1:
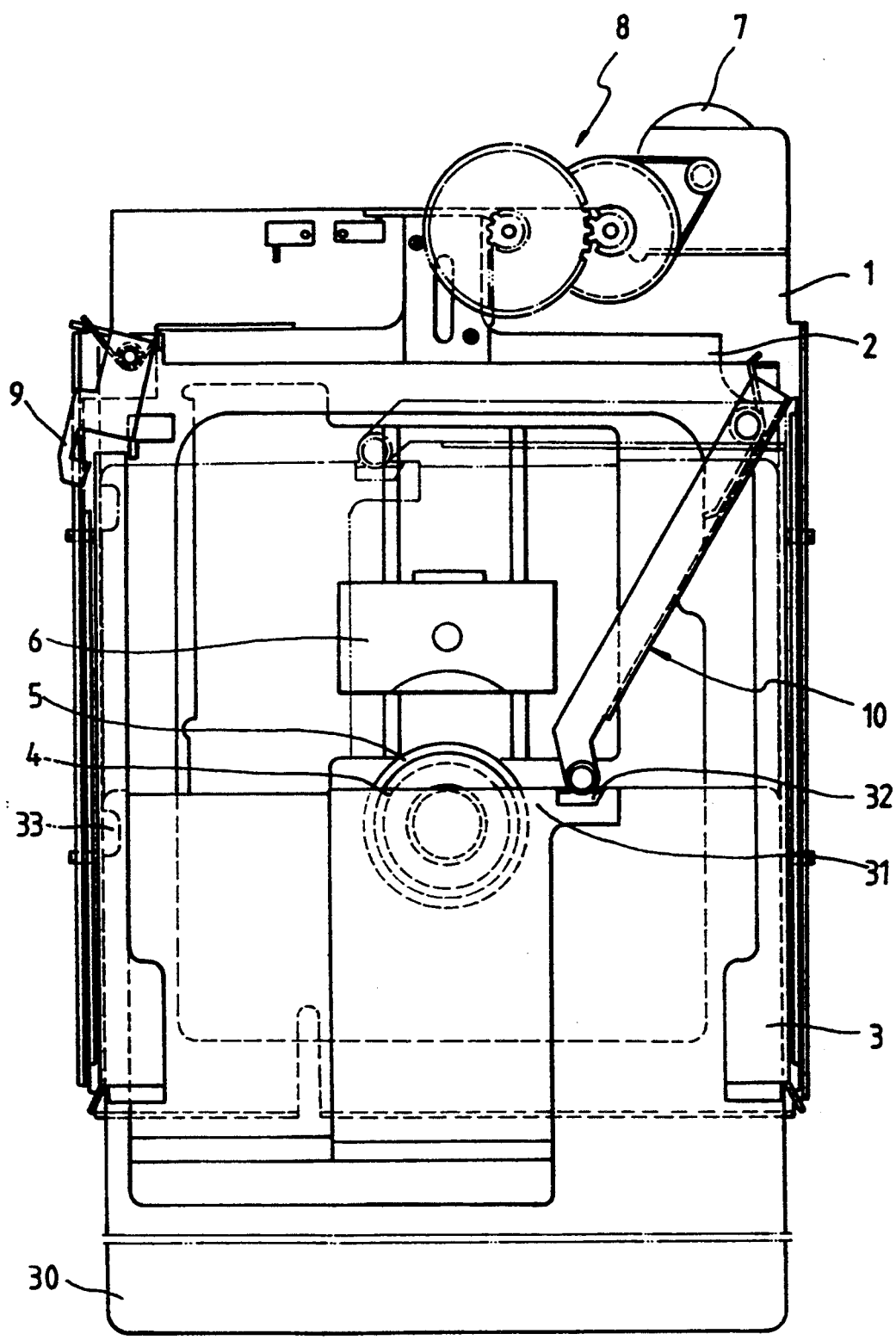
FIG. 1 is a plan view illustrating a conventional optical disc player.
Figure 2:
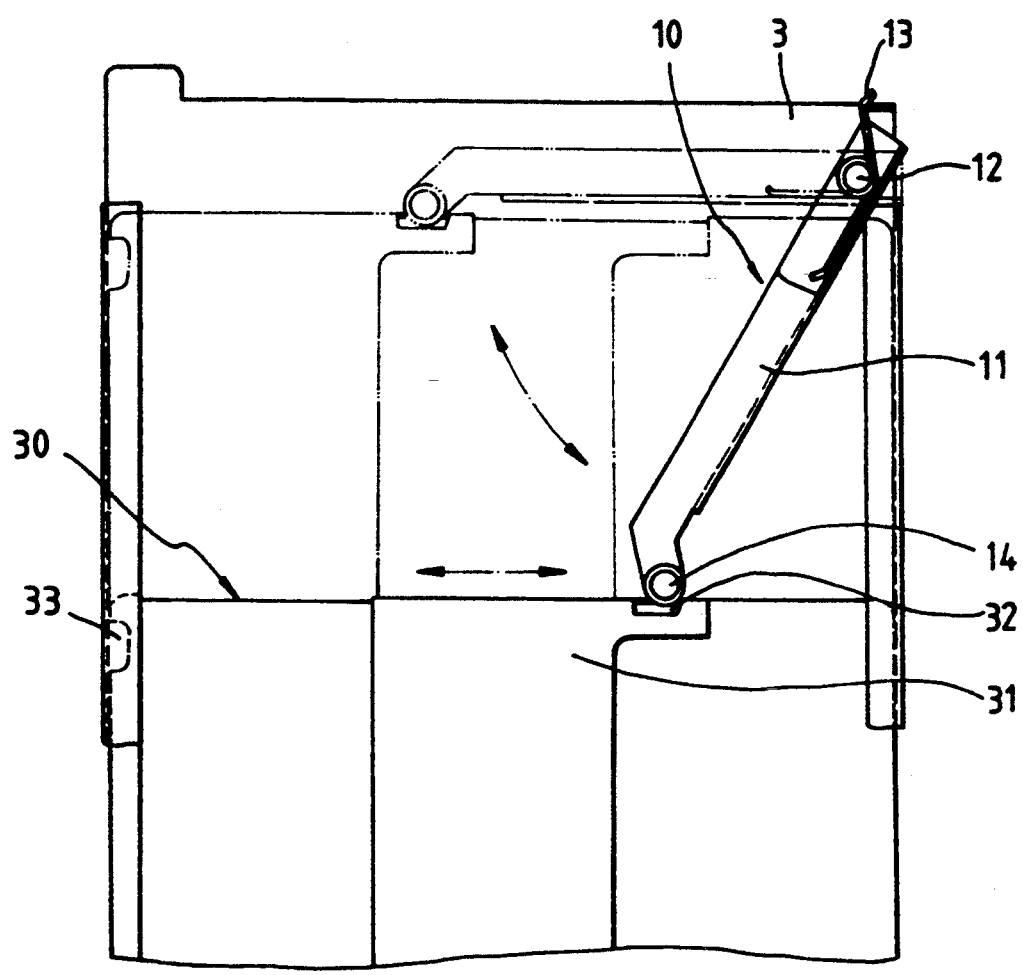
FIG. 2 is a plan view illustrating the cartridge ejector as shown in FIG. 1 and showing the operated state.
Figure 3:
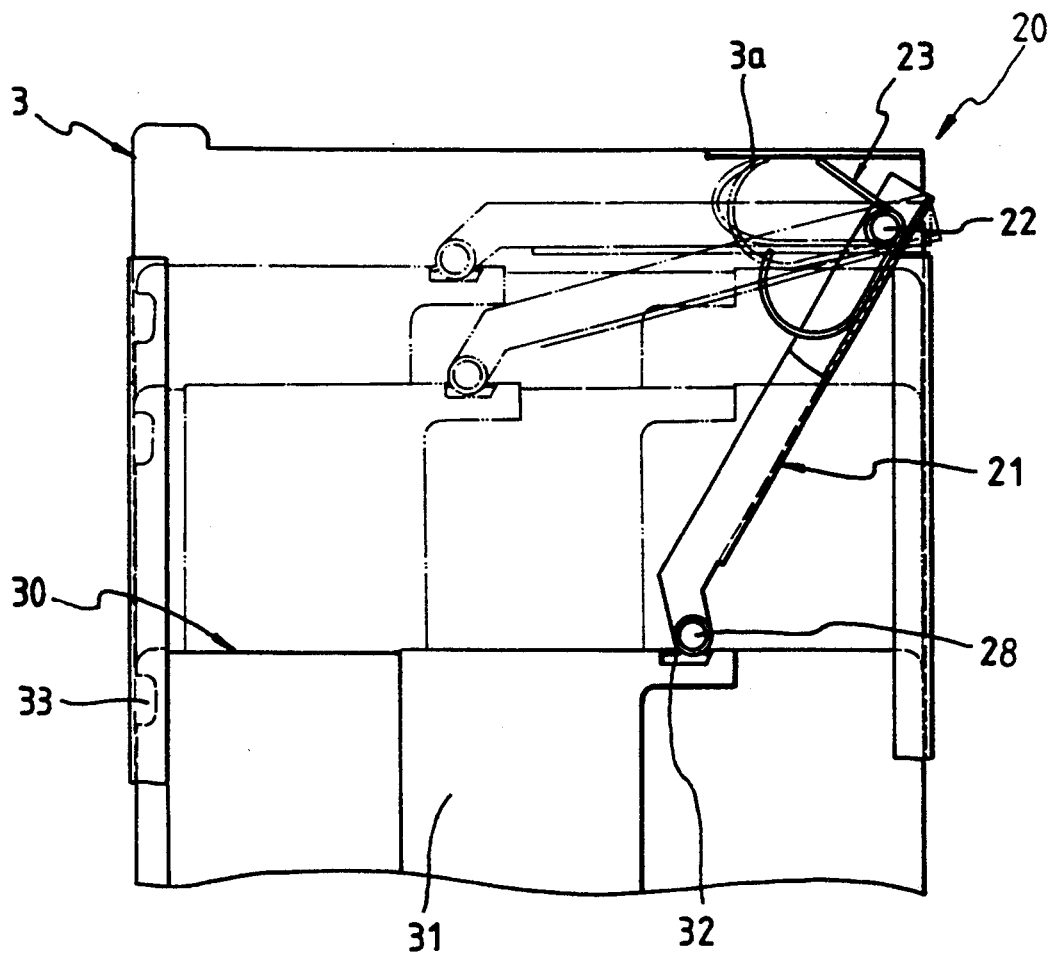
FIG. 3 is a plan view showing the cartridge ejector according to the preferred embodiment of the present invention.
Figure 4:
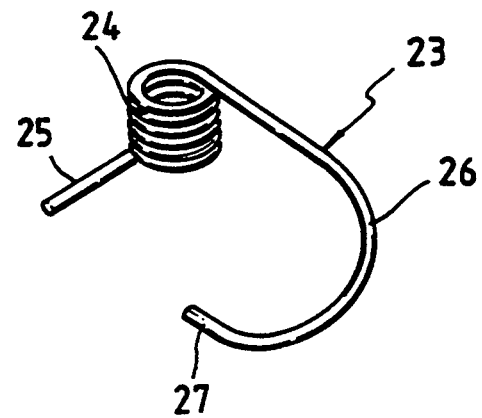
FIG. 4 is a perspective view illustrating a torsion spring as shown in FIG. 3.
Figure 5:
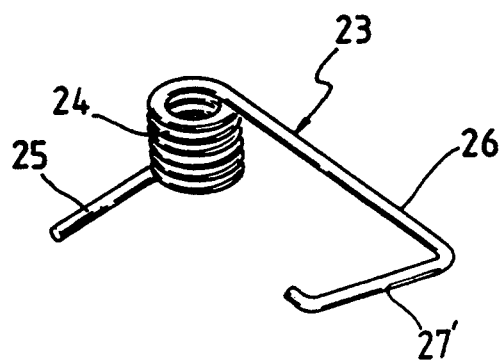
FIG. 5 is a perspective view illustrating a modification of the torsion spring shown in FIG. 4.

FIG. 3 and FIG. 4 illustrate a cartridge ejector of an optical disc player according to a preferred embodiment of the present invention and a torsion spring, respectively. FIG. 5 illustrates a modification of the torsion spring of the preferred embodiment.

As shown in these drawings, cartridge ejector 20 of an optical disc player has torsion spring 23 installed in cartridge holder 3 in order to bias lever 21 about hinge shaft 22. Torsion spring 23 biases lever 21 with a predetermined force. Torsion spring 23 has a predetermined number of coils in coil portion 24 thereof. First support portion 25 of torsion spring 23 extends a predetermined length from one end of coil portion 24 and contacts support plate 3a of cartridge holder 3. Second support portion 26 of torsion spring 23 extends a predetermined length from the other end of coil portion 24 and contacts lever 11. Third support portion 27 of torsion spring 23 extends from second support portion and is bent in a circle or other arcuate shape. Also, third support portion 27 can be of any appropriate shape.

Here, one end of third support portion 27 selectively contacts with support plate 3a of cartridge holder 3. It is desirable that the curvature of third support portion 27 is formed larger than that of coil portion 24. Roller 14, which contacts with shutter 31 of cartridge 30, is installed at the free end of lever 11.

Operation of the cartridge ejector of the optical disc player according to the preferred embodiment will be explained below with reference to FIG. 3.

First, when cartridge 30 is inserted in cartridge holder 3, roller 28 of lever 11 engages with groove 32 of cartridge 30. As cartridge 30 is inserted more deeply, lever 11 is rotated in the clockwise direction about hinge shaft 12. Accordingly, shutter 31 of cartridge 30 is slid to an opened state by roller 28. Here, the initial force required for inserting cartridge 30, that is, the force for making lever 11 rotate, is relatively small because it need only overcome the elasticity of coil portion 24.

At this state, if cartridge 30 is inserted further, third support portion 27 of torsion spring 23 eventually comes into contact with support plate 3a of cartridge holder 3. If cartridge 30 is inserted even more deeply, locker 9 is inserted in hooking groove 33 of cartridge 30 so that cartridge 30 is fixed with respect to cartridge holder 3 and, at the same time, shutter 31 is completely opened. Here, the force required for inserting cartridge 30 is larger than an initial force because the elasticity of coil portion 24 and third support portion 27 operate at the same time to oppose insertion.

It follows that, when cartridge 30 is ejected from the optical disc player, locker 9 is separated from hooking groove 33 of cartridge 30 so that lever 21 is rotated in the counterclockwise direction by the three of restitution of torsion spring 23. Accordingly, cartridge 30 is pushed out into the entrance of cartridge holder 3 and, at the same time, shutter 31 of cartridge 30 is closed by the force of restitution.

More particularly, at the beginning, ejection of cartridge 30 is accomplished by a relatively high force since the elastic force of coil portion 24 and third support portion 27 of torsion spring 23 operate at the same time. Then, when the end of third support portion 27 of torsion spring 23 is separated from support plate 3a, only the elastic force of coil portion 24 imparts force to lever 21.

That is, the force to eject cartridge 30 is the combined force of restitution of torsion 23 and the three tending to bias shutter 31 of cartridge 30 to a closed position less the frictional force of cartridge holder 3 and the frictional force resisting the biasing force of shutter 31.

Therefore, at the beginning, ejection of cartridge 30 is accomplished quickly. Meanwhile, after third support portion 27 of torsion spring 23 is separated from support plate 3a of cartridge holder 3, ejection of cartridge 30 is accomplished relatively slowly. Therefore, the phenomenon that cartridge 30 is over-ejected so as to be separated from the disc player is prevented. If the optical disc player 30 is mounted in a horizontal state or a perpendicular state, torsion spring 23 operates in two steps, so that the ejected quantity of cartridge 30 is uniform, regardless of the frictional forces opposing ejection.

FIG. 5 illustrates a modification of spring 23 having angular third supporting portion 27' which operates in a manner similar to third supporting portion 27.

According to the present invention, the torsion spring operates in two steps, so that over-ejection of the cartridge from the machine is prevented while the cartridge is still ejected smoothly and reliably. Accordingly, the ejected quantity of the cartridge is uniform regardless of the installed state, thereby eliminating the problem wherein the cartridge is over-ejected or is separated from the machine as in conventional devices.

Having described a preferred embodiment of the present invention, it will be clear to those skilled in the art that modifications and alternatives to the disclosed apparatus exist within the scope and spirit of the present invention as defined by the following claims.

What is claimed is:

1. A cartridge ejector of an optical disc player comprising a holder which receives and transports the cartridge, a lever which is rotatable about a hinge shaft disposed in the holder and of which has a free end which contacts with a shutter of the cartridge when the cartridge is received in the holder, elastic means for biasing the lever, said elastic means being a torsion spring comprising:

a coil portion having a predetermined number of coils;

first support portion extending from one end of said coil portion so as to come into contact with said cartridge holder:

second support portion extending from the other end of said coil portion so as to come into contact with said lever; and third support portion extending form one of said second support portion wherein said third support portion comes into contact with said cartridge holder when said cartridge holder is in an inserted position and said third support portion is not in contact with said cartridge holder when said cartridge is in an ejected position.

2. The cartridge ejector as claimed in claim 1, wherein said third support portion is of an arcuate shape.

3. The cartridge ejector as claimed in claim 2, wherein said third support portion is shaped its it semicircle.

4. The cartridge ejector as claimed in claim 1, wherein said third support portion extends at an acute angle with respect to said second support portion.

5. The cartridge ejector as claimed in claim 2, wherein the curvature of said third support portion is larger than that of said coil portion.

* * * * *